United States Patent
Yang et al.

(10) Patent No.: US 9,418,482 B1
(45) Date of Patent: Aug. 16, 2016

(54) DISCOVERING VISITED TRAVEL DESTINATIONS FROM A SET OF DIGITAL IMAGES

(71) Applicant: Google Inc., Mountain View, CA (US)

(72) Inventors: Tsung-Lin Yang, Ithaca, NY (US); Bryce Evans, Milford, PA (US); Keith Noah Snavely, Ithaca, NY (US); Yihui Xie, Ithaca, NY (US); Andrew C. Gallagher, Brooktondale, NY (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 14/288,902

(22) Filed: May 28, 2014

Related U.S. Application Data

(60) Provisional application No. 61/930,141, filed on Jan. 22, 2014.

(51) Int. Cl.
| | | |
|---|---|---|
| *G06T 19/00* | (2011.01) | |
| *G06F 17/30* | (2006.01) | |
| *G01C 21/36* | (2006.01) | |
| *G06Q 50/00* | (2012.01) | |

(52) U.S. Cl.
CPC .......... *G06T 19/006* (2013.01); *G01C 21/3682* (2013.01); *G06F 17/30041* (2013.01); *G06F 17/30873* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 2009/0254842 A1* | 10/2009 | Leacock | H04L 12/1827 715/757 |
| 2009/0290812 A1* | 11/2009 | Naaman | G06F 17/30241 382/305 |
| 2011/0074966 A1* | 3/2011 | Cerosaletti | G06K 9/00664 348/222.1 |
| 2013/0191458 A1* | 7/2013 | Krishnan | H04L 67/22 709/204 |
| 2013/0275894 A1* | 10/2013 | Bell | G06F 9/44 715/764 |
| 2013/0303190 A1* | 11/2013 | Khan | H04W 64/00 455/456.2 |
| 2014/0137011 A1* | 5/2014 | Matas | G06F 17/30 715/764 |
| 2014/0280561 A1* | 9/2014 | DuBois | G06Q 50/00 709/204 |
| 2014/0351717 A1* | 11/2014 | Pryor | G06F 3/0482 715/753 |
| 2015/0031396 A1* | 1/2015 | Hartford | H04W 4/02 455/456.3 |
| 2015/0046442 A1* | 2/2015 | Bannur | G06F 17/30867 707/731 |

OTHER PUBLICATIONS

Agrawal, et al., "CenSurE: Center Surround Extremas for Realtime Feature Detection and Matching", pp. 102-115, 2008.
Li, et al., "Worldwide Pose Estimation using 3D Point Clouds", pp. 1-14, 2012.

(Continued)

*Primary Examiner* — Xiao Wu
*Assistant Examiner* — Steven Elbinger
(74) *Attorney, Agent, or Firm* — Lerner, David, Littenberg, Krumholz & Mentlik, LLP

(57) ABSTRACT

Aspects of the disclosure relate to identifying visited travel destinations from a set of digital images associated with users of a social networking system. For example, one or more computing devices provide access to an individual user's account, including the individual user and other users affiliated with the individual user via the social networking system. One or more digital images are received from a computing device associated with the individual user and from one or more second computing devices associated with the other users of the social networking system. From each digital image, a geo-location is determined for each digital image. The one or more computing devices display each geo-located image on a map at a position corresponding to the determined geo-location for the geo-located image.

20 Claims, 11 Drawing Sheets

(56) References Cited

OTHER PUBLICATIONS

Simon, et al., "Scene Summarization for Online Image Collections", 2007.
Snavely, et al., "Modeling the World from Internet Photo Collections", 2007.
Lindeberg, Tony, "Feature Detection with Automatic Scale Selection" (1998) 53 pgs.
Ke, Yan et al., "The Design of High-Level Features for Photo Quality Assessment" (2006) 8 pgs.
Hays, James et al., "IM2GPS: estimating geographic information from a single image" (2008) 8 pgs.
Zheng, Yan-Tao, et al., "Tour the World: building a web-scale landmark recognition engine" (2009) 8 pgs.

* cited by examiner

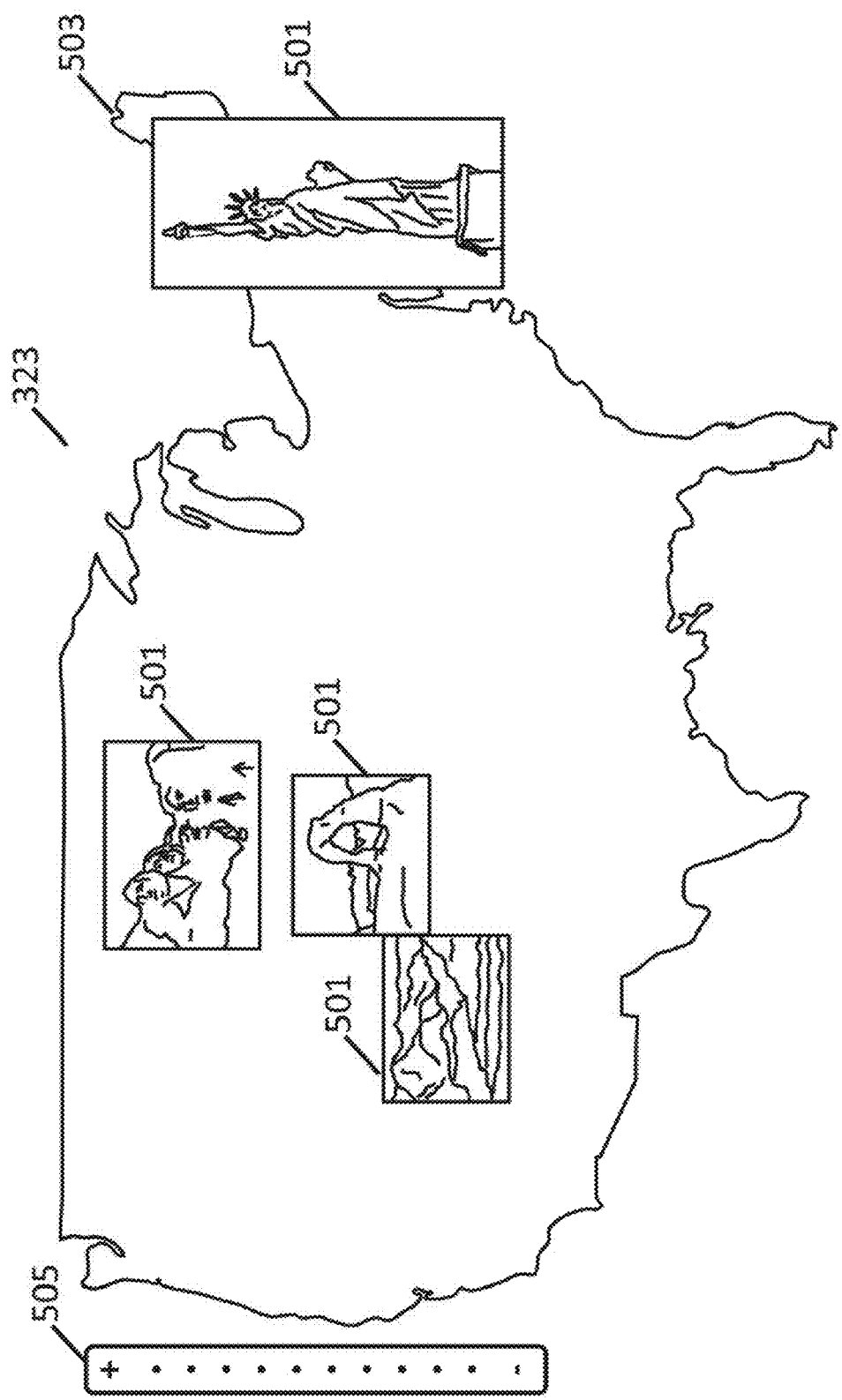
FIG. 5 MAP VIEW

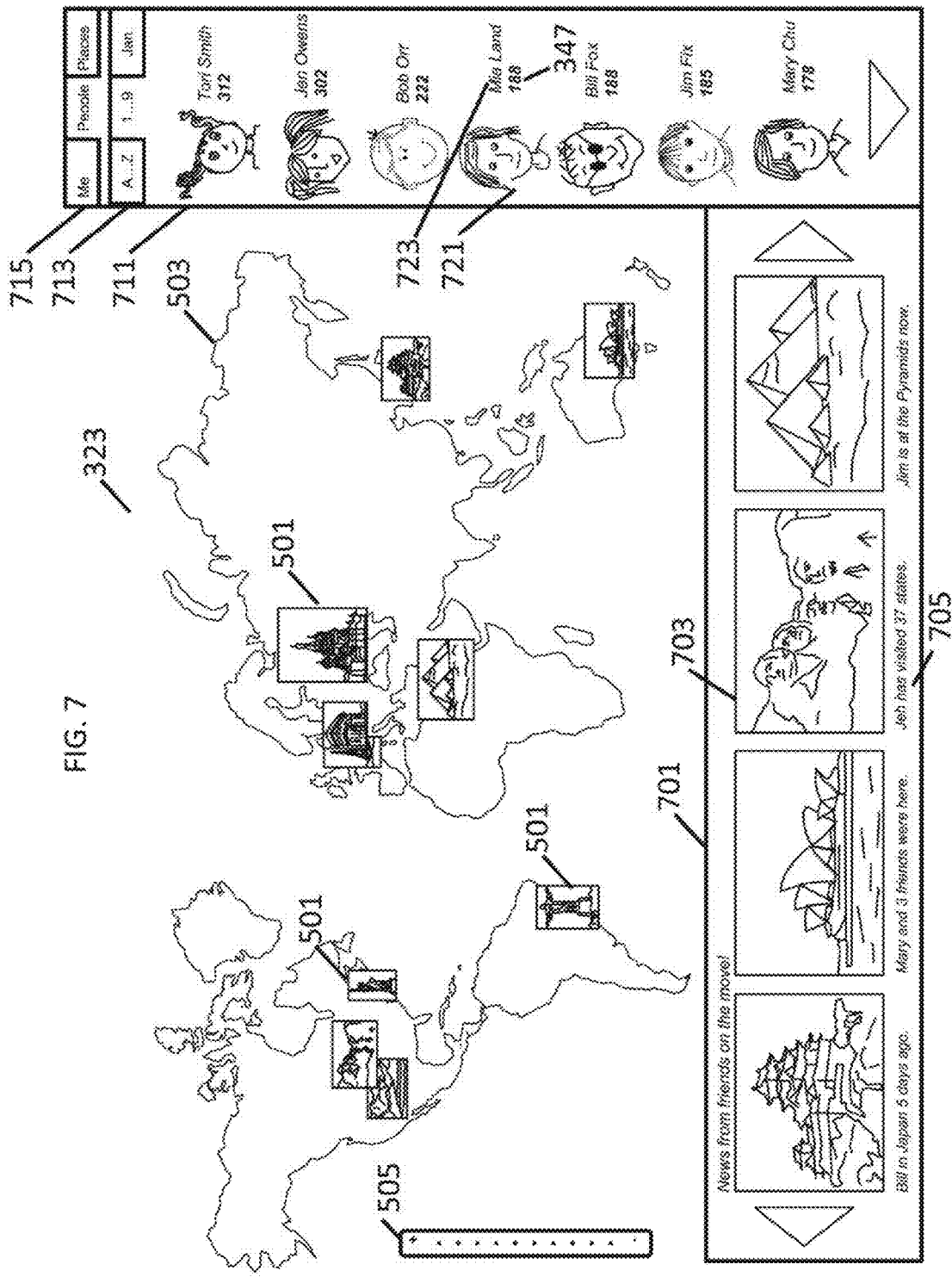

DISCOVERING VISITED TRAVEL DESTINATIONS FROM A SET OF DIGITAL IMAGES

CROSS-REFERENCE TO RELATED APPLICATIONS

The present application claims the benefit of the filing date of U.S. Provisional Patent Application No. 61/930,141 filed Jan. 22, 2014, the disclosure of which is hereby incorporated herein by reference.

GOVERNMENT INTEREST

At least some of the presently disclosed subject matter was made with U.S. Government support under Small Business Innovation Research Grant (SBIR) No. 1248731 (fiscal year: 2013) awarded by the National Science Foundation. Thus, the U.S. Government has certain rights in at least some of the presently disclosed subject matter.

BACKGROUND

Consumer digital imaging has vastly increased the ability for users to amass and share very large numbers of still images, video image sequences, and multimedia records combining one or more images and other content. Still images, audio recordings, video sequences, and multimedia records are referred to collectively herein with the term "media assets," and the term "image" refers both to an individual image, and to videos, which are simply a collection of images with accompanying audio. With very large numbers of media assets, organization can become difficult.

Videos and images are easy to share via the internet through email or social media. It is common for a person (user) to have several hundred contacts on a social networking system, having on average several hundred or thousand images and videos. Therefore, a user can have access to hundreds of thousands or millions of images and videos in his or her social networking system, and hundreds or thousands of images or videos can be added to the user's social networking system in a single day. People generally only look at a small fraction of the images or videos that their contacts in the social networking system publish.

While the ease of sharing media assets facilitates communication between people, the volume of media makes it challenging to organize or summarize a particular contact's collection, or to summarize the aggregate activity across subgroups of contacts.

Efforts have been made to organize images and videos according to the locations in which the images were captured.

Today, many image capture devices have built-in GPS receivers for tagging the approximate locations where an image or video is captured. Unfortunately, this information is often inaccurate or non-existent, especially in "urban canyons." Even when it is present, it can be stripped from the image header in later processing. Further, the content of the image can still be unknown, even though the image is captured at a particular location. For example, an image captured near the Empire State Building may be captured at ground level looking up at the Empire State Building, or the image might be an image of Manhattan, captured from the top of the Empire State Building.

Commercially, several websites and software applications maintain lists of the travels of a particular user. For example, TripAdvisor users indicate cities that they have visited by selecting cities from a list, or entering the names of cities. A personalized map having pushpins at the locations of visited cities can then be viewed, and the cities visited by others in the user's social networking system can also be viewed. Unfortunately, this system relies on manual entry of the cities visited, and therefore many busy users do not enter this information.

Furthermore, these aforementioned methods fail to address issues regarding geo-location of consumer photographs in a social networking environment, where individual users have access to many thousands of images and videos posted by contacts (i.e., friends) on their social network.

BRIEF DESCRIPTION OF THE DRAWINGS

FIG. 5 is a drawing illustrative of an embodiment of a map rendering with geo-registered images.

FIG. 7 is a drawing illustrative of an embodiment of a map that is overlaid with geo-registered images and information panes and controls for navigating the map.

DETAILED DESCRIPTION

Figure 1:
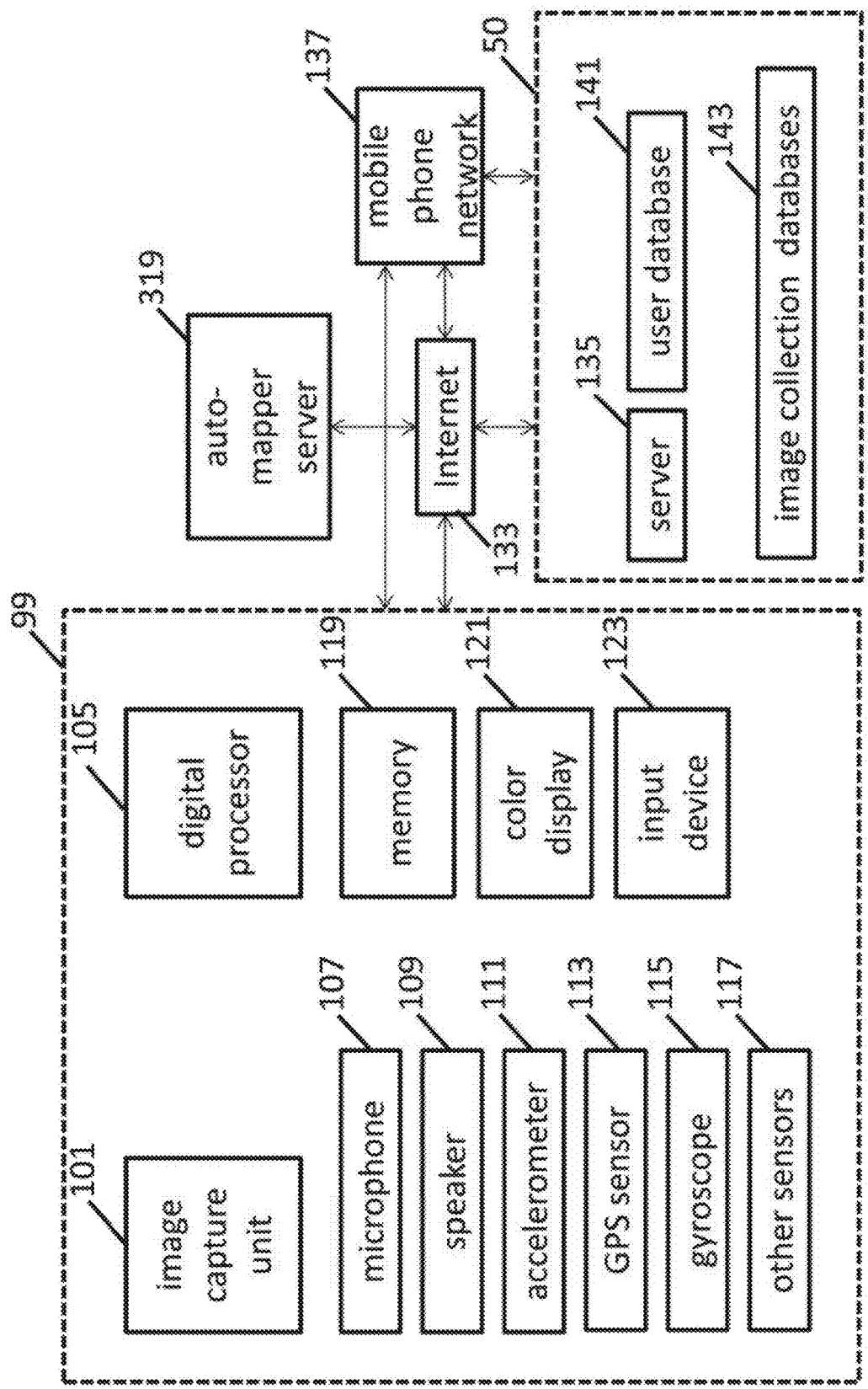
FIG. 1 is a block diagram illustrative of an embodiment of an environment for discovering visited travel destinations from digital images.

The present disclosure is directed towards providing a user of a social networking system with means for exploring images captured by the user's connections within the social networking system. In some embodiments, the system includes analyzing the images to recognize landmark images for estimating the precise locations from which the images were captured, placing these geo-registered images onto a map, and/or providing means for the user to explore the images on this map in a number of intuitive ways. Further, based on the geo-recognized images owned by a particular user, each user can receive a user travel score that further facilitates the user when searching and browsing the images from her connections in the social networking system.

In the following description, some embodiments will be described in terms that can be implemented as software programs. Those skilled in the art will readily recognize that the equivalent of such software may also be constructed in hardware. Other aspects of such algorithms and systems, together with hardware and software for producing and otherwise processing the image signals involved therewith, not specifically shown or described herein may be selected from such systems, algorithms, components, and elements known in the art. Given the system as described herein, in the following, software not specifically shown, suggested, or described herein that is useful for implementation of the invention is conventional and within the ordinary skill in such arts.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The disclosure is inclusive of combinations of the embodiments described herein. References to "a particular embodiment" and the like refer to features that are present in at least one embodiment. Separate references to "an embodiment" or "particular embodiments" or the like do not necessarily refer to the same embodiment or embodiments; however, such embodiments are not mutually exclusive, unless so indicated or as are readily apparent to one of skill in the art.

The present disclosure relates to digital images. Digital images may be still (non-motion) images. Digital images may also be motion digital images, such as digital videos, which can include a plurality of digital image frames. Still and motion digital images are also referred to herein as digital media assets.

In some embodiments, the system can operate as part of, or in connection with, a multi-user online photo-management or social networking service. The method and system can also be applied to on-line social networking websites such as Facebook, Google+, Pinterest, Instagram, Twitter, and MySpace that allow users to upload and share collections of digital media assets with other users. Each individual user is associated with other individual users through connections called "friends", "contacts", "connections", "circles", "followers" or the like. Typically, when users upload digital media assets to their respective internet sites, other users who are "friends" can view the digital media assets. In some cases, a user can select privacy settings for the digital assets that they upload to the social networking system, for example, a user can share an item such as a digital image with a specific friend, a group (i.e., a subset) of friends, friends-of-friends, or publicly to all members of the social networking system, or publicly to everyone with Internet access. In some cases, the users have the option to manually tag the digital media assets that include the identity of persons included in the digital media assets. In some embodiments, the social networking system can include a personalize website, such as a blog, that is available to all users of the Internet and/or is limited to a select group of users.

The system and methods described herein can provide ways for users to geographically explore the images they can access in the social networking system. In some embodiments, the geographic location of an image is determined automatically through a process called geo-registration that includes comparing the appearance of the image with a database of 3D models of various landmarks on earth from photographs. By applying geo-registration to the digital assets of a user on a social networking system, a travel score that indicates the amount of travel for each user can be produced. Using the user travel scores, a plurality of users of the social networking system can be sorted or organized, and their images can be more easily explored.

The Social Networking System Hardware

FIG. 1 is a block diagram illustrative of an embodiment of an environment for discovering visited travel destinations from digital images. As illustrated in FIG. 1, the environment can include a social networking system 50. In some embodiments, the social networking system 50 includes at least one network server 135, connected and accessible via a communications network such as the Internet 133 or a mobile phone network 137. The server 135 can have a Uniform Resource Locator (URL) that allows it to be accessed by other computing devices.

In certain embodiments, the social networking system 50 can exist without a central server, but instead as a peer-to-peer network. In either case, one or more user databases 141 collectively store the associations and connections between users who belong to the social networking system 50. The user database 141 can include user access information such as a username and password, user identification number, and the user identification numbers of other users associated with a user. The user database 141 includes information and media assets that are posted to, or uploaded to, the social networking system 50 by the user, such as status updates, blog posts, and the like. The user database 141 further includes or has access to one or more image collection databases 143 for managing a plurality of digital images and videos, together with metadata associated with the digital images.

User Access Device for Accessing the Social Networking System

In some embodiments, each user can access the social networking system 50 by way of a user access device 99 such as a mobile computing device, a smartphone, a tablet, a personal computer (PC), a digital gaming console, and/or a television, etc. The user access device 99 can include a digital processor 105 (e.g., a central processing unit) for executing instructions and memory 119 for use by the digital processor 105. The user access device can include an input device 123 such as a microphone 107, a mouse, a keyboard, a touch screen, a remote control, a pointer device or the like, and a color display 121, for example an LCD screen, or display output connection for outputting to an external display device. The user access device 99 can also optionally include an image capture unit 101, such as a CMOS or CCD type image sensor array, for capturing digital images. In some cases, e.g., when the user access device 99 is a smartphone, the user access device 99 can include additional sensors or parts, such as a speaker 109 and microphone 107 to provide telephony capabilities, an accelerometer 111, GPS sensor 113, a gyroscope 115, and possibly other sensors 117 to estimate the position of the user access device with respect to the earth's surface or to gather information about the environment (e.g., temperature or humidity) that can be useful for certain applications that are executed on the user access device.

Each user can be provided a user account on the social networking system 50 having an associated user name and password. The user can be considered the owner of this account and can be provided with privileges to specify account settings for that account. The user can also be provided with access to information, such as the digital images associated with the accounts owned by other users with whom the user is connected within the social networking system 50, as will be described in further detail below.

The auto-mapper server 319 can access the social networking system 50 when an individual user provides access. The auto-mapper server 319 can analyze images from the image collection databases 143 that are owned by the individual user or connections of the individual user. The auto-mapper server 319 can perform geo-registration on the images, using computer vision methods to determine a geo-location, and possibly additional information such as tags, landmark names, relevant Internet links, and the like, for recognized images. This information can be used by the auto-mapper server 319 for a variety of tasks, such as displaying the recognized images on a map for presentation to the individual user, determining a user travel score for the individual user and for users connected to the individual user, using the user travel scores to sort, organize, rank, or award tangible or virtual prizes to a set of users of the social networking system, and producing maps indicating the travels of users of the social networking system.

Social Networking System Graph

Figure 2:
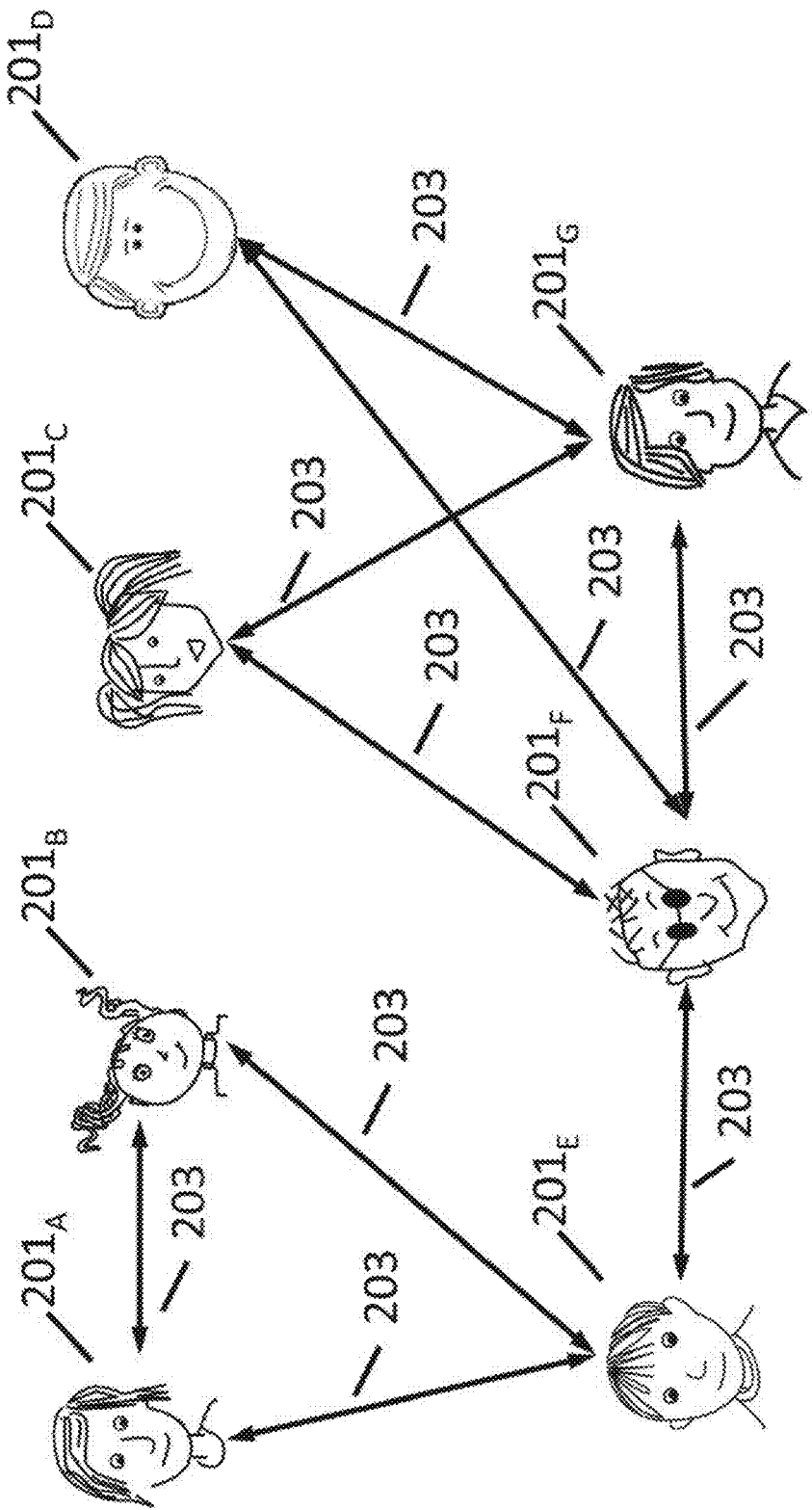
FIG. 2 is an illustration of possible connections between users within a social network.

FIG. 2 is an illustration of possible connections between users within a social networking system 50. In the illustrated embodiment, connections between seven users $201_A$ to $201_G$ of the social networking system 50 are provided. The users 201 are connected with edges that represent the social connections 203 between the users of the social networking system 50. Connections in a social networking system 50 can be established in a variety of ways: in some cases, one user issues a request to connect with another user, and, when confirmed by the second user, the connection is established and recorded in the user database 141. Connections in a social networking system can be unidirectional, bidirectional, or based on membership to subgroups of the social networking system. Not all connections are necessarily equal, and connections can come in a variety of types such as friend, relative, co-worker, or additional social relationships. In any case, the system can operate within a social networking system where the connections of a user determine which digital assets that that user can access and which digital assets that the user shares, and with whom. For example, in FIG. 2, user $201_F$ has four connections (to users $201_C$, $201_D$, $201_E$ and $201_G$), and he has access privilege to view the images posted to the social networking system that are owned by these four users.

Sharing in a Social Networking System

Typically, within a social networking system, an image or video that is uploaded or published to the social networking system is owned by the user who uploads it. In some embodiments, the owner can control which other users of the social networking system can view the image through privacy settings. In some instances, when a user uploads a digital image, other users who are "friends" can view the digital media assets. In some cases, a user can select privacy settings for the digital assets that they upload to the social networking system, for example, to share the image with no users, with all friends, with friends-of-friends, or publicly (that is, with all users of the social networking system, or all users of the Internet).

Auto-Mapper

Figure 3:
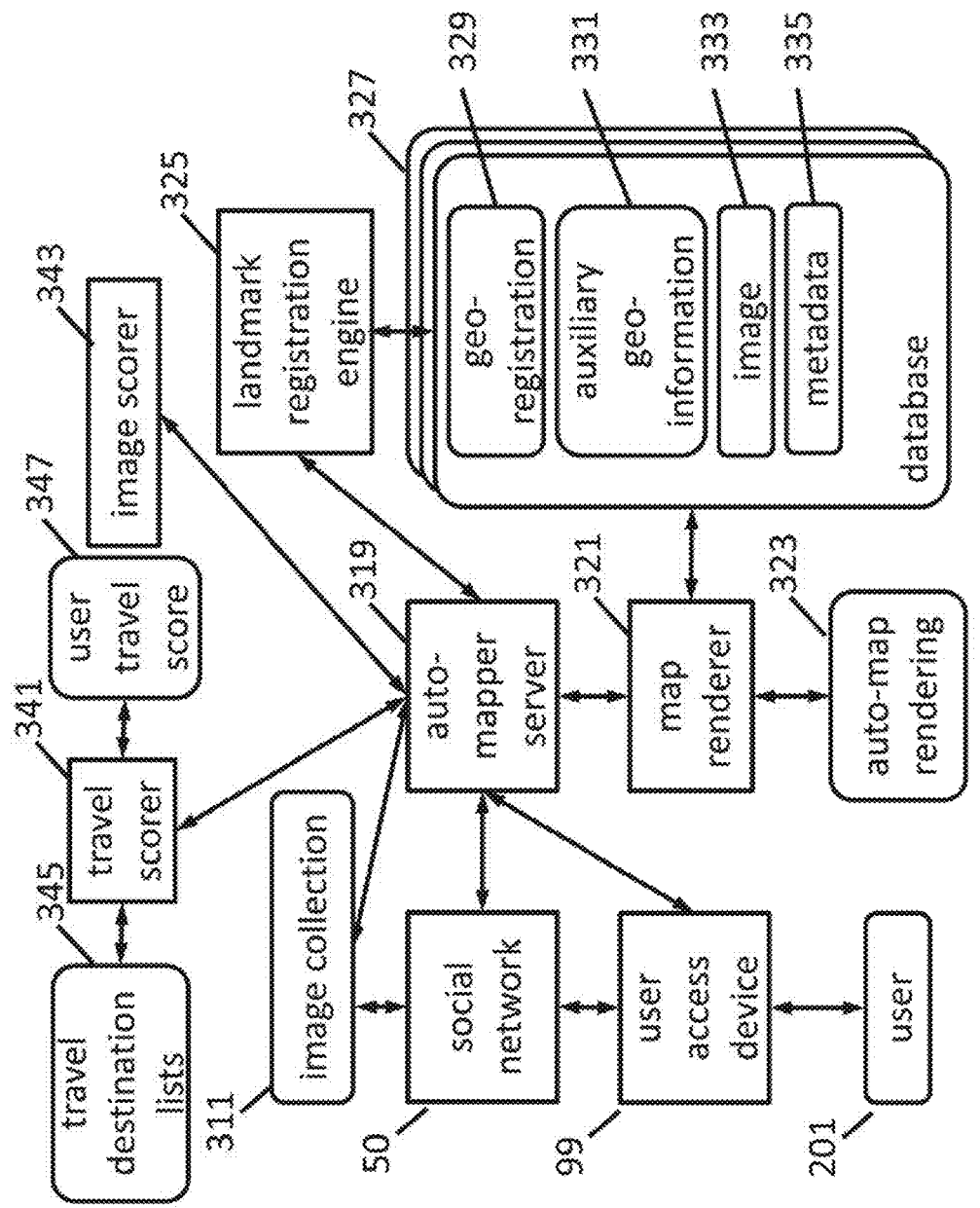
FIG. 3 is a block diagram illustrative of an embodiment of an environment for discovering visited travel destinations from digital images.

FIG. 3 is a block diagram illustrative of an embodiment of the environment for geo-registering images within a social networking system and displays the results on an interactive map for exploration by the user. As described below, the system can enable a user to quickly explore the travels of his or her connections in the social networking system.

As described herein, a user 201 with a user access device 99 can be a member of a social networking system 50 and can have a set of connections to other users within the social networking system 50. The user 201 has access to an image collection 311 that includes images owned by the user's connections of the social networking system 50 that she has permission to access. For example, for user $201_G$ of FIG. 2, the image collection 311 that the user $201_G$ has access to can include images owned by users $201_C$, $201_D$, and $201_F$.

The user 201 can provide access to her user account to the auto-mapper server 319. This access can include a list of the connections between that individual user and other users of the social networking system 50. The auto-mapper server can include a digital processor that receives and analyzes the images in an image collection 311 that includes some subset of images from the social networking system 50 that a particular user 201 has permission to view. The image collection 311 can be the images from among the user's 201 friends' images that the user 201 has permission to view, or the images from the user's friends' friends, or those images plus some subset of publicly viewable images. The auto-mapper server 319 can analyze images to geo-recognize the images, automatically determine the geographic coordinates of where recognized images were captured, and produce an auto-map rendering 323 of geo-recognized images placed on a map.

The auto-mapper server 319 can be any digital processor that can access the images from the social networking system, and need not be distinct from the hardware associated with the social networking system 50 itself (e.g., server 135). The auto-mapper server 319 can control or include a landmark registration engine 325 that attempts to geo-recognize images 333 from the image collection 311. The landmark registration engine 325 can perform geo-registration in a number of ways, such as, but not limited to the methods described further in FIG. 4A-FIG. 4E.

Whether an image 333 is recognized or not by the landmark registration engine 325, the result can be stored in a database 327 that stores recognition results in association with each image 333. The actual image pixel values of the image may or may not be stored in the database. For example, a URL or image identification number can be stored. For a recognized image, the geo-registration result 329 can be stored, indicating the position of the image on the globe, e.g., in latitude and longitude. In addition, auxiliary geo-information 331, such as the name and ID number of the landmark (e.g., Notre Dame, Louvre Museum, Statue of Liberty, Old Faithful geyser), city name, country name, altitude, links to one or more Wikipedia articles, and the like can be stored in association with the image 333. Metadata 335, such as the focal length, image owner and identification number, camera distortion parameters, internal camera parameters, time and date of image capture, camera flash fire information, and possibly more can be stored in association with the image 333 in the database, and can optionally be stored in the image file itself (e.g., using the EXIF standard).

The database 327 can store the results returned from the landmark registration engine 325. Because of this, when an additional user enrolls by providing the auto-mapper server 319 with access to his account on the social networking system, the landmark registration engine 325 can, in some embodiments, omit geo-recognition of images that have already been processed. For example, suppose user $201_G$ in FIG. 2 provides access to the auto-mapper server 319, and the auto-mapper server attempts to geo-recognize the images from user $201_G$ and her connections ($201_F$, $201_C$, and $201_D$). The database 327 stores the results. Next, user $201_F$ desires to see the images captured within his social networking system mapped, and provides access information to the auto-mapper server 319 to geo-recognize his images, and the images of his connections ($201_E$, $201_C$, $201_D$, and $201_G$). However, his own images, and the images from users ($201_C$, $201_D$, and $201_G$) have already been processed, leaving only the images from user $201_E$ to be processed. In this manner, the database 327 of results can conserve computing resources as the geo-registration and mapping application spreads throughout the social networking system 50.

Recognizing Landmarks from Images with 3D Models

Figure 4A:
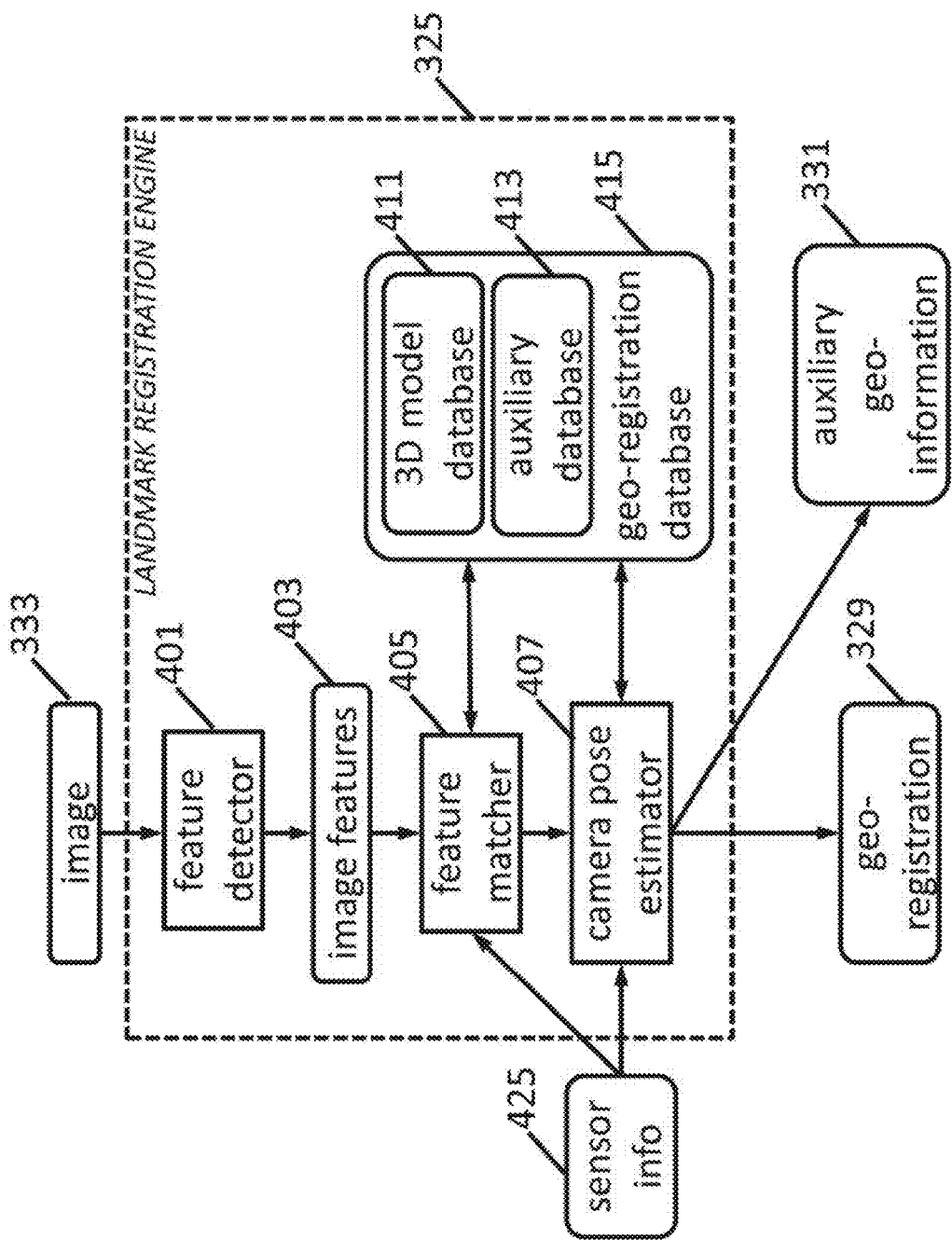
FIG. 4A is a block diagram illustrative of an embodiment of the landmark registration engine.

Turning now to FIG. 4A, an illustration of the landmark registration engine 325 is provided. The purpose of the landmark registration engine 325 can be to receive an image 333, and find its location on the globe. The landmark registration engine 325 can determine the geo-location for an image in any of several ways. For example, the landmark recognition engine 325 can check an image's header information (e.g., the header of an EXIF image) for embedded geo-position information, possibly recorded by a GPS sensor associated with a camera, as for example is common with a camera phone.

In another embodiment, the landmark recognition engine 325 can analyze the pixel values of an image to extract features that capture either local or global patterns of appearance to determine its geo-location. For example, one method that can be employed by the landmark recognition engine 325 is presented by J. Hays and A. Efros, "im2gps: estimating geographic information from a single image," CVPR, 2008, incorporated herein by reference in its entirety, where coarse patterns of color and edges are used to describe the scene, and are matched to a dataset of training images for estimating the geo-location of the image. Alternatively, interest feature points can be extracted from an image and matched (either ignoring or considering 2D or 3D geometric considerations) to interest feature points extracted from a training set of images having known geo-location, such as described by Y. Zheng, et al., "Tour the world: Building a web-scale landmark recognition engine," CVPR, 2009, incorporated herein by reference in its entirety.

In some embodiments, the landmark recognition engine 325 can determine a geo-location for an image by comparing it to a set of 3D models in a geo-registration database 415 that includes a 3D model database 411 representing hundreds, thousands, or more landmarks across the globe, each of which can be associated with auxiliary information 413, such as, but not limited to, keywords, Wikipedia, or other Internet links. From this comparison, the landmark recognition engine 325 can determine precise geo-coordinates of where the image was captured, and in some embodiments, do so relying solely on the clues from the appearance of the image. In certain embodiments, the landmark recognition engine 325 can determine precise geo-coordinates from external sensor information 425. Furthermore, in some embodiments, the landmark recognition engine 325 can determine precise geo-coordinates using a combination of clues from the appearance of the image and/or the external sensor information 325.

The landmark recognition engine can output the geo-registration 329 and auxiliary geo-information 331 associated with the image. One skilled in the art will recognize that landmark recognition from an image can also be accomplished using 2D image techniques rather than the 3D model matching, and has been shown to perform more robustly. For example, 2D matching is used in "Tour the World: building a web-scale landmark recognition engine" by Zheng et al, CVPR 2009, but this method lacks the means for producing highly accurate camera pose and position because geometry is ignored.

Geo-registration of an image 333 can be performed by finding a plausible camera position from which the image could have been captured, given the arrangement of feature point positions in the image compared to the known positions of those points in the 3D world, as represented in a 3D model from the 3D model database 411. A detailed description of an embodiment for producing geo-registration estimates from a set of landmark 3D models of points and an input image is described in "Worldwide Pose Estimation Using 3D Point Clouds," Yunpeng Li, Noah Snavely, Dan Huttenlocher, European Conference on Computer Vision (ECCV), Florence, Italy, October 2012, incorporated herein by reference.

For example, in some embodiments, feature detector 401 can receive an image 333 for detecting and describing image features 403 from the image 333. An embodiment of a feature detector is described in U.S. Pat. No. 6,711,293, incorporated herein by reference, which detects interest points by finding extrema in a difference-of-Gaussian pyramid, and describes each interest point as a histogram of gradient orientations in several (16) subregions about the interest point. Another embodiment of a interest point detection methods is described in M. Agrawal, K. Konolige, and M. Blas, "Censure: Center surround extremas for realtime feature detection and matching," in ECCV, 2008, and T. Lindeberg, "Feature detection with automatic scale selection," in Int. Journ. of Comp. Vision, 30:79-116, 1998, incorporated herein by reference.

The image features 403 are input to a feature matcher 405 that finds matches between the image features 403 and points from the 3D model database 411, based on the feature point descriptions of the points and the features. In some embodiments, matches are found by finding the point with the smallest Euclidean distance from a particular feature (or vice-versa), measuring distance in the feature point description space. When a threshold number of matches is achieved, the camera pose estimator 407 determines the position and rotation (6 degrees of freedom) for the camera that captured the image 333, such as by minimizing the distance between rays emanating from the camera center through a random subset of selected image features and the corresponding matching points from a particular model from the 3D model database 411, which in some embodiments, can be referred to as RANSAC and bundle adjustment.

The 3D models in the 3D model database 411 can be built from sets of images, typically mined from the Internet, of a given landmark. For example, a set of 1000 photos of Mt. Rushmore, of which 452 are registered, can be used to produce a model including 133994 points, or 3D points. It will be understood that as used herein, the term "landmark" can refer to any location on that reasonably has visual distinctness. Landmarks can be man-made (e.g., Eiffel Tower), naturally occurring in nature (e.g., the Grand Canyon), or a combination of the two (e.g., many areas of Niagara Falls). Landmarks can be popular tourist destinations, underwater locations (e.g., the Great Barrier Reef or the wreckage of the Titanic), a small venue such as a restaurant or hotel, a painting or artwork, or even a residential house or room within a home.

If sensor information 425 corresponding to the image 333 is present, it can be used by the feature matcher 405 and camera pose estimator 407 to improve the accuracy or speed of the landmark registration engine 325. When the sensor information 425 includes initial geo-position information from a GPS sensor, then the feature matcher 405 can search for matches to the image features 403 and points from the 3D model database 411 only within a given radius (e.g., 5 km) from the initial geo-position.

Handling Confusing Points and Annotating Points

As previously described, the landmark registration engine 325 can use a 3D model database 411 of 3D models that each include a set of points that have been registered so that each of the points has a computed geo-location associated with it. At test time, features from a test image can be extracted, and matched to points in the 3D models, and registration can be performed to calculate a camera geo-location position for the test image.

In some embodiments, the system can reduce false positive matches, and label specific points within a 3D model, which can then be used to render pixel-accurate annotations onto the image.

Figure 4B:
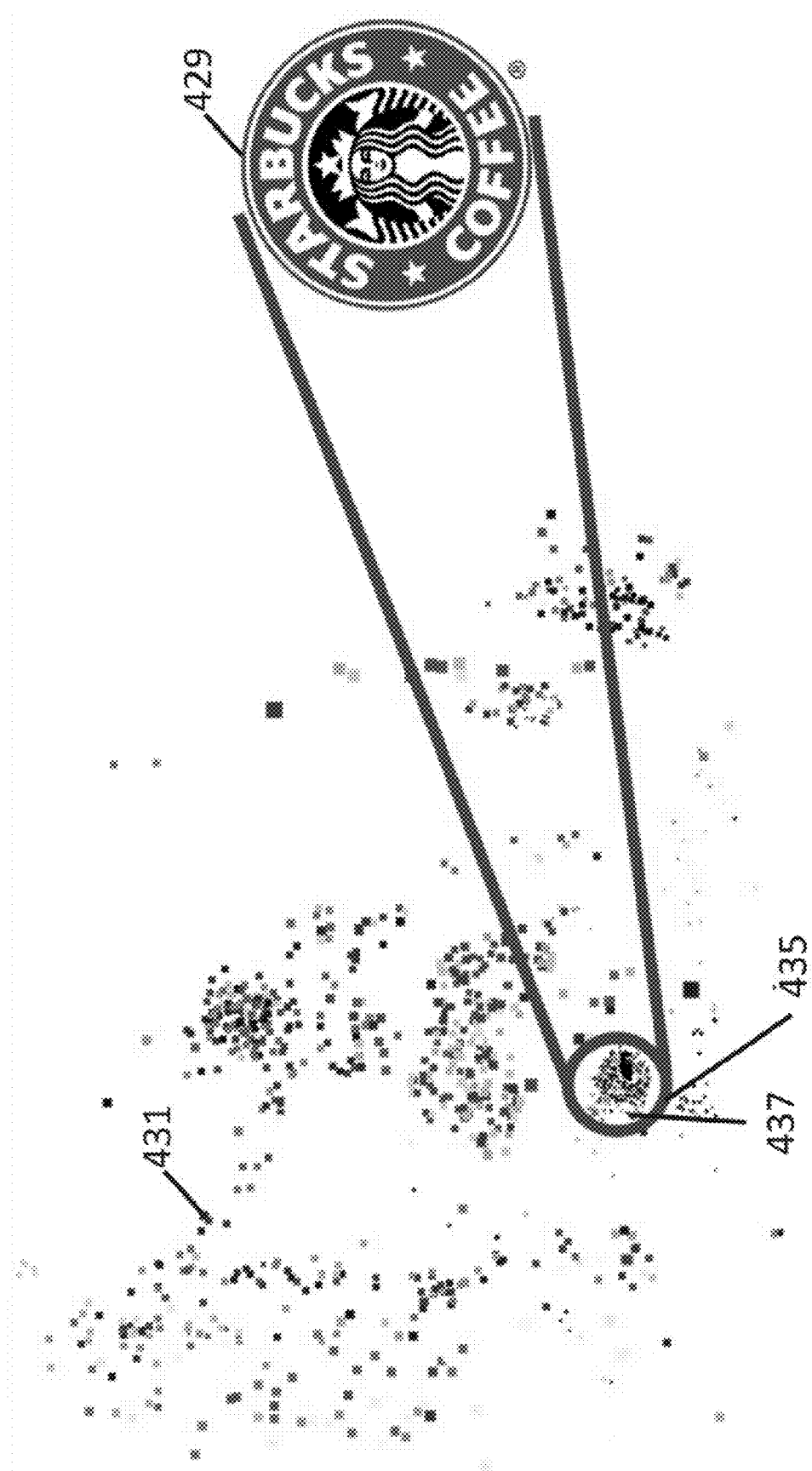
FIG. 4B is a diagram illustrative of an embodiment of a 3D point annotator for labelling points as confusing.

Regarding the problem of false positive matches, a 3D model in the 3D model database 411 can include a representation of an object that occurs at many locations world-wide. Then, when a test image includes any instance of these objects, a false match can occur and an incorrect geo-location for the image is produced. FIG. 4B illustrates an example of this problem. On the left side of FIG. 4B is a rendering of many geo-registered points 431 from a 3D model that were learned from a set of images of Universal Studio's RiverWalk in Orlando, Fla., downloaded from the Internet. This 3D model happens to include a logo for the popular coffee company Starbucks, which has many thousands of locations worldwide. 3D points 437 in the circled region 435 belong to the 3D model, and are associated with the Starbucks logo. Without identifying and handling the false-positives, when a test image happens to include a Starbucks logo 429, e.g., if a person is pictured holding a cup of coffee, its feature points can match the points in this model and be incorrectly geo-registered to Orlando, Fla.

Figure 4C:
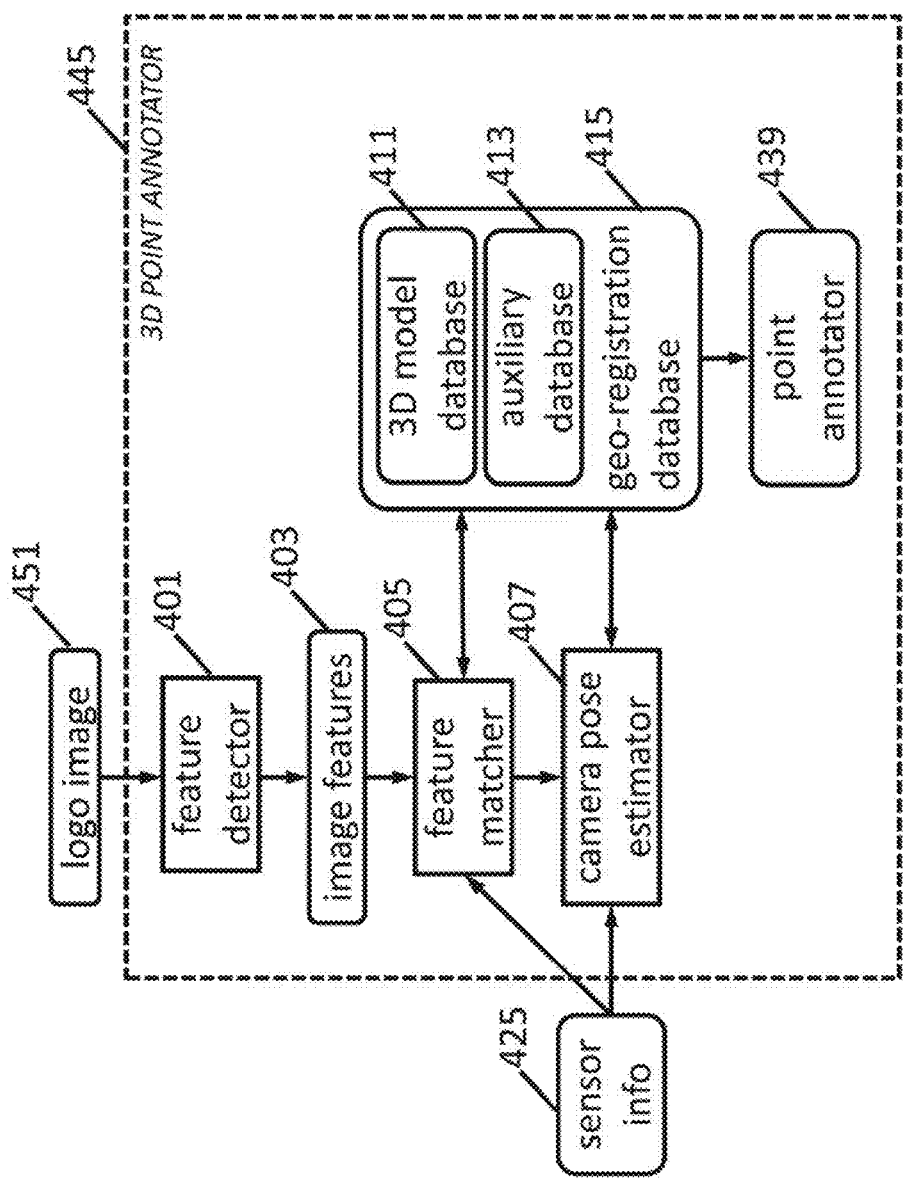
FIG. 4C is a block diagram illustrative of an embodiment of the 3D point annotator for labelling points as confusing.

FIG. 4C is a block diagram illustrative of an embodiment of an 3D point annotator 445 for labelling points in 3D models from the 3D model database 411 to reduce the occurrence of incorrect false positive matches. To accomplish this, the 3D point annotator 445 can determine points from 3D models of the 3D model database 411 that belong to objects, such as logos, street signs, text (e.g., "The," "Office Hours," etc.), posters, mass-produced products, etc., that have many instances across the globe. These 3D points can be identified and annotated in the geo-recognition database 415 with a low uniqueness factor, or as having more than one instance or location, or as "confusing." In some embodiments, the 3D point annotator 445 can use several components from the landmark registration engine 325.

With continued reference to FIG. 4C, the identification of confusing 3D points in the 3D model database 411 that are associated with company logos, such as the Starbucks logo shown in FIG. 4B is illustrated. In some embodiments, a logo image 451, such as the logo 429 shown in FIG. 4B, has image features 403 that can be extracted by the feature detector 401. The feature matcher 405 can match these image features 403 to the 3D model database 411. When a particular 3D model from the 3D model database 411 has a sufficient number of matches (e.g., at least 10 feature matches), the 3D points in the 3D model can be assigned a low uniqueness factor. For example, the 3D points can be annotated as "confusing" or "ambiguous," by the point annotator 431, and that annotation can be stored in the geo-registration database 415. Although the 3D point annotator 445 of FIG. 4C is illustrated as using a logo image 451 to identify the confusing 3D points, it will be understood that a similar process can be performed using images of other potentially confusing objects, such as street signs, text in signs, and other mass-produced items.

In some embodiments, a database of company logos, street signs, street lights, and/or other potentially confusing and/or mass-produced items, as well as items that are considered less confusing and/or items that are considered unique, can be used to assign a uniqueness factors to 3D points in one or more of the 3D models in the 3D model database 411. Relatively low uniqueness factors can be assigned to 3D points that are very common, medium uniqueness factors can be assigned to 3D points that are somewhat common or somewhat unique, and/or high uniqueness factors can be assigned to 3D points that are very unique and/or not common Any combination of the above-referenced assignments can be made as desired. For example, only low uniqueness factors can be assigned to 3D points that are considered common. The database can be based on items extracted from the images and/or uploaded images of the potentially confusing items.

Once 3D points are labelled as "confusing," or assigned a low uniqueness factor, the 3D registration engine 325 from FIG. 4A can use this information to improve performance by reducing false positive matches. Specifically, in some embodiments, for an image to be declared to be a match to a certain 3D model in the 3D model database 411, the 3D registration engine 325 can wait until a threshold number of matches between image features 403 extracted from the image and non-confusing 3D points (e.g., 3D points that have not been annotated as being confusing and/or 3D points with a high uniqueness factor) in the 3D model is satisfied. Once the threshold number of matches is satisfied, the camera pose estimator 407 can proceed as described before. Accordingly, in some embodiments, the 3D registration engine 325 can ignore, or give less weight to, 3D points in the 3D model that have been assigned a low uniqueness factor and/or annotated as "confusing" or "ambiguous." By discounting the contribution of potentially "confusing" 3D points, the number of false positive matches can be substantially reduced.

The threshold number of matches non-confusing 3D points can vary based on the uniqueness of the image features identified in the image and/or the number of 3D points in the 3D model that are assigned a low uniqueness factor. For example, if the image feature identified is the Eiffel Tower, the threshold can be one image feature. However, if the image feature is a silhouette of a large building, the threshold number of image features can be three, five, ten, etc. (which can be used to determine a particular city skyline, etc.).

In certain embodiments, the 3D registration engine 325 can use a range or scale to annotate 3D points and/or image features. For example, 3D points and/or image features that are ubiquitous, such as STOP signs, can be annotated as "very confusing," "ubiquitous," etc., image features and/or 3D points that are still common, but less ubiquitous, such as a store logo, can be annotated as "confusing," and image features and/or 3D points that are relatively unique, such as a statue, distinct building or skyline, rock formation, etc., can be annotated as "uncommon," or "unique."

The 3D registration engine 325 can use the scale to determine how much weight is to be given to different image features and/or 3D points to determine whether to match an image with a 3D model. For example, the 3D registration engine 325 can give more weight to image features and/or 3D points that are less common and/or more unique, and less weight to image features and/or 3D points that are more common or confusing. In some embodiments, the 3D registration engine 325 can use the image features and/or 3D points annotated as less common and/or more unique to narrow down to a specific geographic location, and then use image features and/or 3D points that are more common to help further pinpoint the geographic location. Furthermore, the 3D registration engine 325 can use one or more combinations of image features and/or 3D points annotated as "confusing" to generate an image feature that is "less common," or "unique." For example, while a single store logo may be considered "confusing," a combination of three or more store logos in the same image and/or 3D model may be considered "less common" or "unique."

It will be understood that the terms "confusing," "very confusing," "ubiquitous," "uncommon," or "unique," are used as non-limiting examples, and that any number of methods can be used to annotate image features and/or 3D points. In some embodiments, a numerical range or scale can be used.

For example, the 3D registration engine 325 can assign a '1' for very ubiquitous image features and '10' for unique image features, etc.

In another embodiment, the point annotator 439 can use additional annotations for 3D points, in addition to the annotation of "confusing". For example, the point annotator 439 can use an annotation of the company name of the logo image 451. Consequently, when a test image including a logo is used as an input to the landmark registration engine 325 of FIG. 4A, there may be insufficient non-confusing matches for the test image to be geo-located. However, a set of features from the image can match to "confusing" points in a 3D model that have an additional annotation, such as "Starbucks". Although geo-location was not possible, the test image can be annotated as a "Starbucks" image. Further, the location of the Starbucks logo in the test image is known—for example, a rectangle is rendered on the test image so that it can include the set of image features that matched points in a 3D model that were previously annotated as confusing and as "Starbucks". This rectangle can indicate a likely location of the Starbucks logo in the test image.

In some embodiments, additional information can be used to estimate the location of the image. For example, the system can use GPS data and/or other geo-located images to estimate the location of the image. In some embodiments, the system can refer to the additional information and/or a database storing all the locations of Starbucks to estimate the location of the user when the image was taken. Similarly, the database can include known locations of multiple companies, stores, outlets, etc. to aid in identifying the location of a particular image.

Furthermore, if the system can geo-locate a first and third image of three images as being near each other, but cannot geo-locate the second image, the system can estimate that the second image is likely near the first and third images. In such embodiments, the system can indicate a likely or estimated location of the image. In some embodiments, the system can assign a confidence level to the estimate location of the second image based on the geo-location of the first and third images. If the confidence level satisfies a threshold, the system can indicate the estimate position. If the confidence level does not satisfy a threshold, the system can indicate that the location is unknown. Although described for three images, it will be understood that the location of more than one image can be estimated based on the known geo-location of an image taken before and an image taken after the non-geo-located images.

Similarly, if a timestamp of two images, whether taken with the same device or different device, indicates a relatively small amount of time passed between them (e.g., less than a minute, a few minutes, etc.) and the first image can be geo-located, but the second cannot (or vice versa), the system can estimate the location of the second image based on the amount of time that has elapsed and/or an average travel speed of the user (likely walking, riding, driving, etc.). In some embodiments, the slower the travel of the user and/or the less time that has passed between images can lead the system to place greater confidence in the estimated location of the second image. In certain embodiments, if a confidence threshold is satisfied, the system can indicate the estimated location to the image. In some embodiments, if the confidence threshold is not satisfied, the system can indicate that the location of the image is not known. Although described for two images, it will be understood that the location of more than one image can be estimated based on the known geo-location of an image taken before or after the non-geo-located images, depending on the elapsed time between images and/ or an average travel speed of the user. Furthermore, it will be understood that any combination of the above-referenced embodiments can be used to determine the location of an image.

Figure 4D:
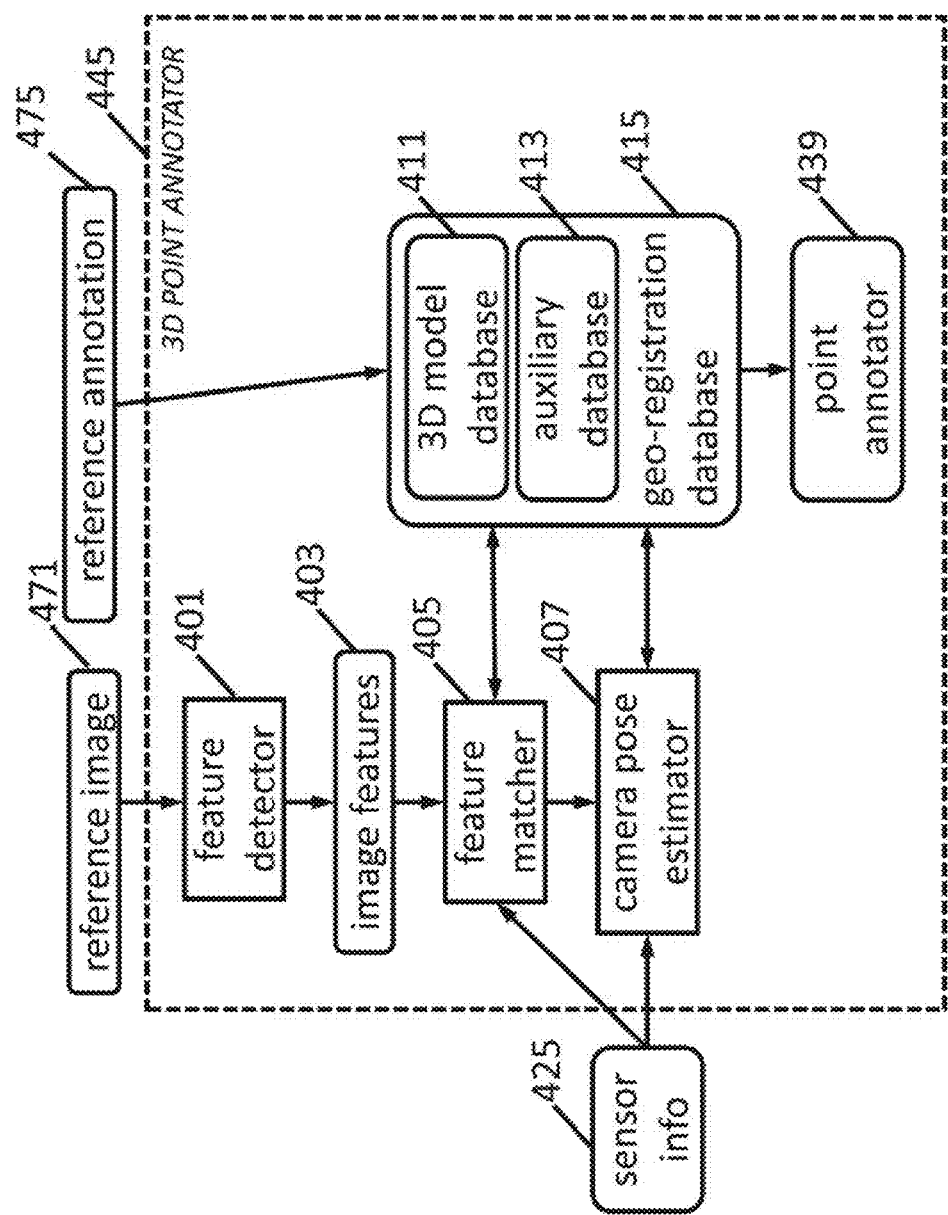
FIG. 4D is a block diagram illustrative of an embodiment of the 3D point annotator for annotating 3D points from 3D models.

FIG. 4D illustrates an embodiment for annotating points in the 3D model database 411 using a reference image 471 and a reference annotation 475. In some embodiments, a reference image can include an object, such as a painting, building, or landmark, and the reference annotation 475 is a polygonal outline of the object in the reference image, and can include the name or title of the object. For example, if the reference image is of the Eiffel Tower, the reference annotation 475 can be an outline of the building (i.e., a set of 2D point coordinates in the reference image that form a polygonal outline of the Eiffel Tower) and the name "Eiffel Tower". The reference annotation 475 can include a coarse outline, such as a rectangle, or a precise outline. The 3D point annotator 445 can be used to extract features from the reference image 471, and match these features to a 3D model in the 3D model database 411 as previously described.

If a match is found, the points in the 3D model that match points associated with, or included within, the object outline of the reference annotation 475, can be labelled with the reference annotation 475 in the geo-registration database 415. Further, because the 3D geo-positions of matching points are known, the 3D positions of the points from the object outline can be estimated by geometric fitting, such as by fitting a 3D plane to the positions of the 3D points that match, and then calculating the intersection of the points on the object outline and the 3D plane. In this way, the object outline is transformed from a 2D shape in the coordinate system of the reference image 471 to a 3D shape (planar) having geo-located points.

Figure 4E:
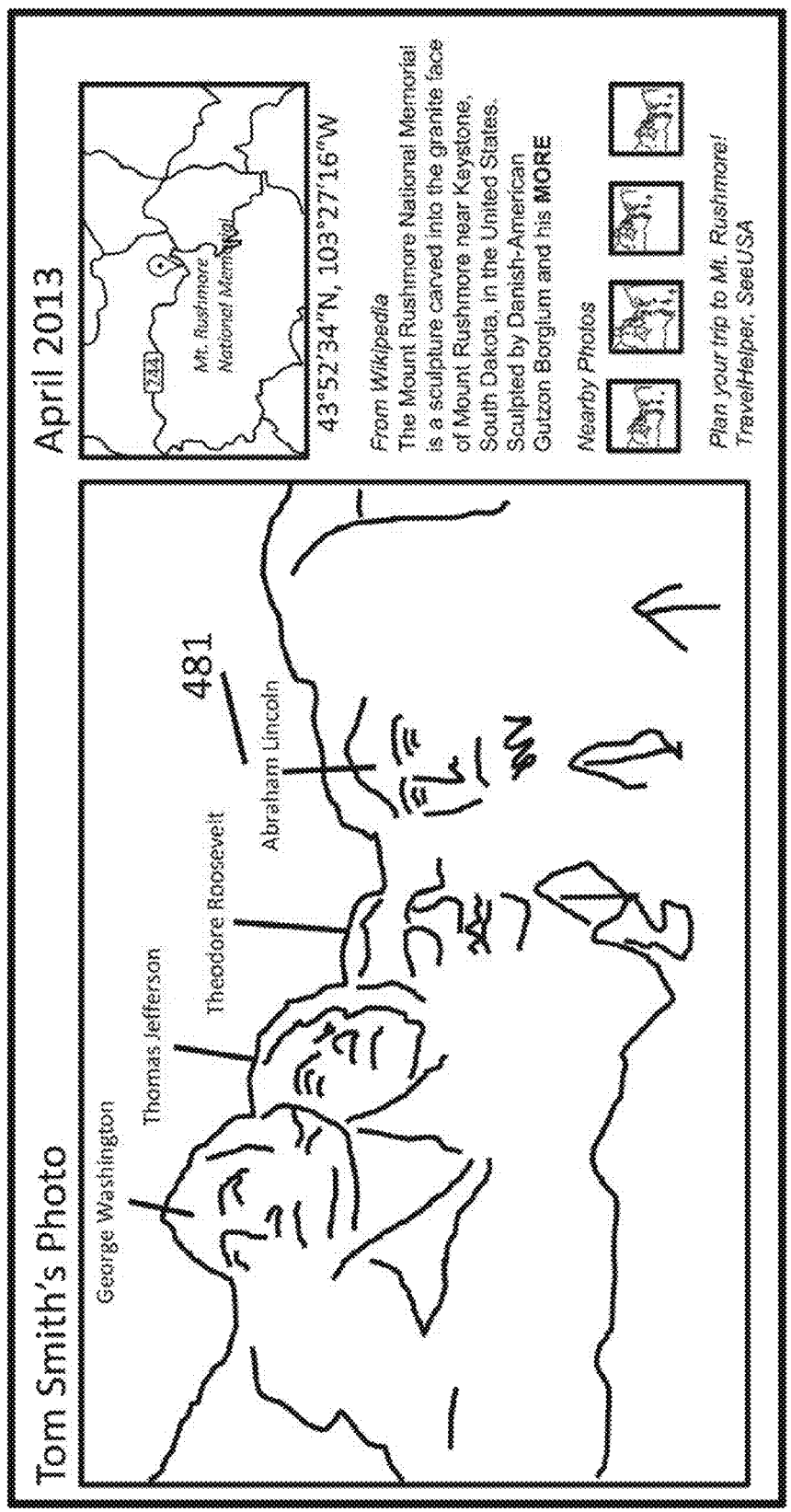
FIG. 4E is a drawing illustrative of an embodiment of an image that has overlaid annotations for objects.

When a test image is used as an input to the landmark registration engine 325 of FIG. 4A, it can include features that match to points that are annotated by the 3D point annotator 445. The test image's camera geo-position and parameters can be recovered by the aforementioned process. Annotations associated with one or more 3D points that match features in the test image can be rendered onto the test image for display purposes. For example, FIG. 4E shows an example test image 471 that includes renderings for four rendered annotations 481, one for each of the Presidential busts that comprise Mount Rushmore. Annotated 3D points are also useful for defining regions within a test image that allow for user interaction with the test image. For example, the convex hull of the 3D points associated with Thomas Jefferson in FIG. 4E, when projected into the image coordinates of the test image, can be used to define a hot region in the image that serves as a link—when Jefferson's head is touched or clicked on, additional relevant information can be displayed.

Auto-Map Rendering

Figure 6:
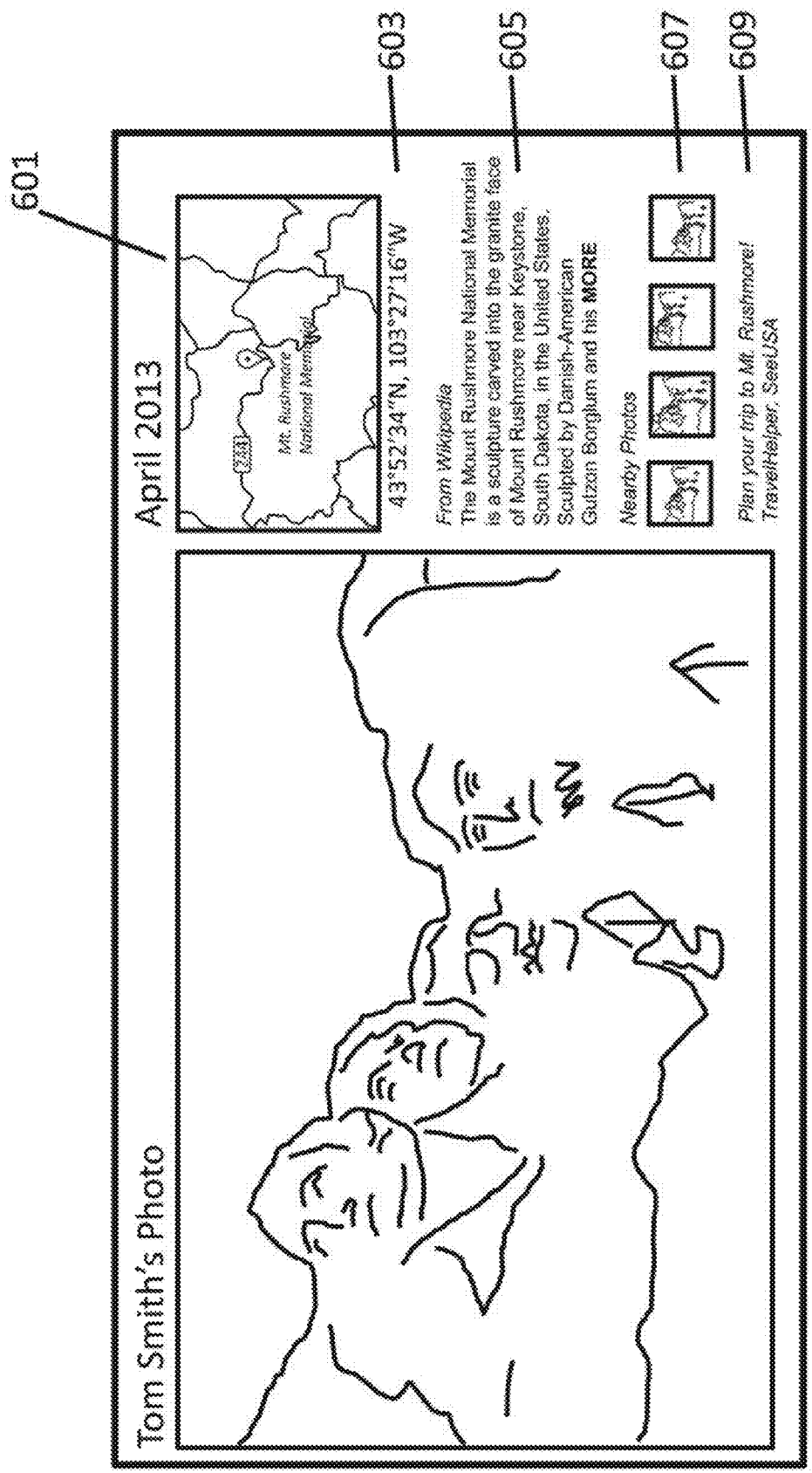
FIG. 6 is a drawing illustrative of an embodiment of an image view that provides additional information related to a geo-located image.

Referring again to FIG. 3, the auto-mapper server 319 can use a map renderer 321 to produce an auto-map rendering 323 of the recognized images from a user's connections within the social networking system that are stored in the database 327. An example of the auto-map rendering 323, is shown in FIG. 5, where thumbnail versions of geo-registered images are placed on the map at positions corresponding to their determined geo-locations. In some embodiments, the map renderer 321 produces an auto-map rendering 323 by placing thumbnail images 501 produced from recognized images, onto a map 503 for user navigation, exploration, and control. The auto-map rendering 323 also includes user interface controls 505 so a user can navigate the map by zooming, panning, or searching for specific regions. In certain embodiments, when a user selects a thumbnail image 501, the auto-mapper server 319 receives the selection, and the map renderer 321 produces an auto-map rendering 323 including an image view, a magnified view of the thumbnail image (e.g., in higher resolution) along with auxiliary information 331, such as a link to the Wikipedia page, a link to the image on the social networking system, or a link to the owner of the image, as illustrated in FIG. 6. Further, as illustrated in FIG. 6, the geo-registered location for the image 333 can be displayed with an inset map 601 and the recovered geo-coordinates 603 can be displayed in numerical form. The aforementioned auxiliary information 331 can be rendered to the auxiliary display 605, and thumbnail images 607 of nearby images, found by computing the distances from the image 333 to other successfully geo-registered images, are displayed for the user to use for exploring more images from her social networking system.

Although FIG. 5 shows only 4 geo-registered images, in practice, the number of displayed thumbnail images can number in the hundreds or thousands. It is common for a user of a social networking system to have access to the photos of her friends on the social networking system, and the number of these images can be in the hundreds of thousands or millions. Of these, several percent are often captured at recognizable locations, resulting in thousands of geo-recognized images for a user to browse. To facilitate browsing, in certain embodiments, no more than a fixed number of images on the map can be displayed, or the thumbnail images 501 can be displayed with different sizes depending on the quality, popularity, or absence or presence of other geo-recognized images at nearby map positions. In some embodiments, the image scorer 343 of FIG. 3 can be used to provide a score for each geo-recognized image. This score can be used as a priority score for determining the order of selection for placing thumbnail images on the map by the map renderer 321. Accordingly, important, popular, or good quality images can be given priority for placement on the map, while lower quality images can be placed on the map if there is room. The image scorer 343 is described in more detail herein below.

When a user views images that depict the travels of her connections within the social networking system, it is common for her to desire to travel to one or more of the landmarks she has viewed. Referring again to FIG. 6, action suggestions 609 can be placed in association with the geo-recognized image 333. These action suggestions can provide a suggested action for the user: to plan travel with one or more partner sites (e.g., the fictitious TravelHelper or SeeUSA travel sites). Further, action suggestions can recommend a book or video that describes the depicted landmark that might be of interest to the user, or a link for the user to write an email to a friend from her social network that has traveled to the depicted landmark. In certain embodiments, the action suggestion can be a link to one or more partner sites, including travel, tourism, or review/rating websites, and can be provided to the user for the purpose of aiding the user to travel to the destination or venue depicted in the image. The partner sites can provide payment for appearing as an action suggestion for the user.

The map renderer 321 from FIG. 4 can select action suggestions from the geo-registration database 415, based on sets of advertisements or links that are associated with particular travel destinations or landmarks. Partner sites can bid against one another for the right to be featured in an action suggestion 609 corresponding to specific travel destinations. For example, the price for a partner site to be featured in an action suggestion for a popular or exotic destination (e.g., traveling to Disney World) will likely be more expensive than the price for a partner site to be featured at a more obscure, or less traveled location (e.g., the birthplace of U.S. President Martin Van Buren).

User Travel Scores:

Referring again to FIG. 3, the auto-mapper server 319 accesses a travel scorer 341. The purpose of the travel scorer 341 is to produce user travel scores 347 that quantify the travel experience level achieved by different users of the social networking system 50, including the user 201, and other users that are connected to the user 201 with a link in the social networking system 50.

There are several different methods by which the travel scorer 341 can produce a user travel score 347. For example, the user travel score 347 can simply be the number of geo-recognized images owned by a particular user.

In some embodiments, the user travel score 347 can be based on the number of unique places or landmarks that a user has visited, rather than the number of geo-recognized images. Suppose a user traveled to the Statue of Liberty and captured 100 images. A second user traveled to the Grand Canyon, Mt. Rushmore, the Statue of Liberty, and Arches National Park, but captured only one image at each destination. Intuitively, the second user is more well-traveled than the first, since she visited 4 destinations versus 1 for the first, despite the fact that the second user captured only 4 images, and the first captured 100. In this embodiment, the user's travel score 347 is determined by analyzing the auxiliary geo-information 331 for each geo-recognized image belonging to the user in the database 327, and counting the number of unique landmark ID numbers included in that set.

In a further embodiment, the user travel score 347 can be based on the physical distance between the geo-locations of recognized images. To compute this version of the user travel score, the physical distance between every pair of recognized images (or, between landmarks) owned by a particular user is computed using well-known methods for computing distances between points on the surface of the earth, such as the Vicenty formula or the Haversine formula. Next, the minimum spanning tree is found, and the cost associated with this tree can be the user travel score 347 corresponding to the minimum distance traveled to connect the images owned by that particular owner. In another embodiment, the time that each image is captured is considered, and the user travel score 347 can be the sum of the physical distances between consecutively geo-recognized images owned by that user.

In a further embodiment, the user travel score 347 can correspond to points earned by the user for her travels. In this embodiment, the travel scorer 341 can access one or more travel destination lists 345. A travel destination list 345 can include the name, locations, or landmark ID numbers of interesting sets of destinations, a requirement for the number of those landmarks to be visited by the user, and the number of points awarded for completing the travel destination list. The travel scorer 341 can check whether a user's geo-recognized images from the database 327 satisfy the requirements associated with the list, and awards points, or tangible or virtual prizes accordingly when a travel destination list is completed. In some embodiments, a travel destination list is said to be completed for a particular user when each the requirement list is fulfilled by geo-recognized images owned by that user. For example, the user can be awarded 100 points for capturing a least one image on each of the seven continents. Or the user can be awarded 50 points for capturing images of at least 10 state capitol buildings. As another example, the user can be awarded 200 points for visiting at least 10 UNESCO World Heritage sites, and a user can be awarded 75 points for visiting 5 or more National Parks, etc.

In a further embodiment, the user travel score 347 can depend not only on which images of the user are geo-recognized, but can be competitive or cooperative based on the other users of the social networking system. For example, the travel scorer 341 can award 10 points to a user for being the first to visit a particular landmark from the subset of users including the user herself and users connected to her. In another example, a user can earn one point for each unique landmark that she has a corresponding geo-recognized image associated with, and another point if she is the most recent visitor from among the connections from her social networking system. In another embodiment, a challenge can be issued (e.g., the first user to photograph all stadiums from the National Football League will receive 500 points) and the first user to capture the correct images after the challenge is issued received the reward. In this embodiment, the user travel score that a user receives can be dependent upon the user's connections within the social networking system, which makes the score a fun and competitive travel experience.

In some embodiments, the user travel score 347 can be time-sensitive, that is, the score is the accumulation of points earned only within a recent time window, e.g., the past year.

In still another embodiment, the user travel score 347 can depend on the popularity or the aesthetic quality of that user's image, in addition to the number of landmarks that have been visited. For example, in some social networking systems 50, a user has the ability to express approval of an image that a friend or connection has posted by pressing "like," upvote, or "+1". Then, the user travel score 347 can be the sum of the number of times that this expression of approval has occurred with the geo-recognized images owned by the user.

Verifying the Location of the User

In certain embodiments, sensor information 425 can also be used to verify whether a user is physically at the landmark that is depicted in a captured image. The travel scorer 341 can produce a user travel score 347 for a user based on the images that the user owns. In some situations, a user may try to increase his or her score by capturing images of images, or by uploading images originally captured by another person. In some embodiments, the travel scorer 341 can ignore images that have sensor information 425 that indicates that the user is at a different location from the landmark that is recognized in the image. For example, if a user uploads an image of the Great Wall of China that is recognized as such, but, at the same time, the GPS sensor indicates that the user is in Buffalo, N.Y., then the travel scorer 341 may not award points to the user for that image. A likely explanation is that the user was in Buffalo, but captured the Great Wall of China image from a book or computer screen.

Travel News Pane and Map Navigation Pane

FIG. 7 depicts an embodiment of the auto-map rendering 323. The auto-map rendering 323 is viewed on a user access device 99. One skilled in the art understands that certain adjustments can be made to the auto-map rendering 323 depending on the modality of the user access device 99. For example, buttons on touch screen displays typically occupy a greater portion of the screen space because they are selected with a touch of a finger instead of a mouse click.

The auto-map rendering 323 depicted in FIG. 7 primarily differs from the automap rendering 323 depicted in FIG. 5 by including a map navigation pane 711 and a travel news pane 701. These panes provide a user 201 with several different methods for searching and browsing the images of the auto-map rendering 323.

The travel news pane 701 provides the user with a view of recently recognized images from the user's connections from the social networking system 50. For example, each thumbnail image 703 is accompanied with a headline 705, informing the user of recent events of recognized images within the user's set of connections from the social networking system 50. For example, a headline can indicate that a friend's image was geo-recognized in a specific country or at a specific landmark: e.g., Bill was at Himeji 5 days ago. Headlines 705 can also capture collective events that summarize the travel history for a particular user of the social networking system 50, or for a particular place or landmark. For example, a headline can convey "Jen has visited 37 states" when a photo of hers from South Dakota is geo-recognized by the landmark registration engine 325, and previously, she had images recognized in 36 other states. Alternatively, a headline for a particular place can be displayed in the travel news pane 701, for example, "Mary and 3 friends were here" can be displayed when Mary's image of the Sydney Opera House is geo-recognized, and previously, three other friends of the user had geo-recognized images corresponding to the same location. The headlines 705 and thumbnail images 703 in the travel news pane 701 increase user engagement with the application; that is, the travel new pane 701 automatically displays newly geo-recognized images to the user, and provides insightful summarizations of the travel patterns of particular friends, or to particular places, from the users social networking system. In some embodiments, the travel new pane 701 can be an interactive user interface element; when the user selects an image, the display responds by zooming in on the corresponding region of the map, or by enlarging the thumbnail image in an image view as illustrated in FIG. 6. In certain embodiments, the system can link the name from a headline 705 to that person's account on the social networking system 50. It will be understood that further variations and modifications are within the scope of the disclosure.

Alternatively, the headlines 705 rendered to the map can also, or alternatively, be posted as an update, or status message, to the social networking system 50. In this embodiment, when a particular user uploads an image to the social networking system and it is recognized by the landmark recognition engine 325, the headline description produced by the auto-mapper server 319 can be posted to a the user's personalized page on the accessible via the social networking system. For example, when Jim posts an image that is recognized as the Great Pyramid of Giza, the auto-mapper server 319 can generate a status update "Jim is at the Great Pyramid of Giza right now" along with the image. In another example, if Egypt is the $25^{th}$ country that Jim has visited, the auto-mapper server produces a status update "Jim has visited 25 countries!" that is posted along with the image he captured. Status updates are generated from the recognized image using one of several templates, two of which are included below for illustration.

a) <Name> was at <Place><ElapsedDays> days ago.

b) <Name> is in <CountryName> and has visited <CountryCount> countries!

where <Name> is replaced with the name of the user 201, <Place> is the placename of the landmark in the image based on the recognized geo-location, and <ElapsedDays> is the number of days that have elapsed from the time the image was captured to the present. In b) above, <CountryName> is the name of the country that the recognized landmark is located, and <CountryCount> is the number of countries that the user has captured images that have been recognized with the landmark recognition engine 325.

The map navigation pane 711 can provide a means for the user to navigate the geo-recognized images by various places, or by select individuals with whom the user is connected. The map navigation pane 711 can include user controls 713, 715 for sorting elements on the map navigation pane 711.

One set of user controls 715 can allow the user to select whether to show information related to "me", "people", or "places". As illustrated in FIG. 7, "people" is selected. In this mode, the map navigation pane 711 shows icon faces 721 and corresponding user names 723 for individuals from the social networking system connected to the user. A second set of user controls 713 allows the user to sort these elements (friends from the social networking system, in the depicted case), alphabetically, by user travel score 347, or by most recently geo-recognized photo. One skilled in the art will recognize that there are many other ways of sorting the elements of the map navigation pane 711, e.g., by age, or by length of time that the person has had a social network connection with the user, that are also within the scope of the disclosure. Further, when the user selects a particular icon face 721 from the map navigation pane 711, an action is taken, such as highlighting that individual's images on the auto-map rendering 323, or removing or deemphasizing the images belonging to other individuals.

By displaying the user's friends in order of their user travel scores 347 on the map navigation pane 711, a user can quickly see which of her friends has the most travel experience, and perhaps will seek advice from one or more well-traveled individuals when planning travel. In this way, the user travel score 323 can be used to sort or organize the user's set of connections from the social networking system. In certain embodiments, the map navigation pane 711 can display a user's friends' user travel scores 347 with a numeric representation, but other representations of the user travel scores are also within the scope of the disclosure. For example, in one embodiment, an icon or keyword is used to indicate a particular score range, such as the word "GlobeTrotter" for a user with a user travel score above 1000, the word "Tourist" for a user with a user travel score between 500 and 999, and the word "NonTourist" for a user with a user travel score under 500. The user travel score can be displayed pictorially in some embodiments, for example, the user travel score 347 is shown by displaying prize icons, or small images, that represent the travel accomplishments that a user has earned. For example, a user can earn prize icons or virtual trophies by completing one or more travel destination lists.

In another embodiment or mode of operation, the map navigation pane 711 can display a "global leaderboard" of users of the social networking system, that are not necessarily connected to the individual user. In this mode, the individual user can view an indication of the user travel score of the user or users from the social networking system with the greatest (or least) user travel scores 347.

When the user selects the "places" mode with the user controls 715, the map navigation pane can show a list of places, each having a corresponding icon image, in a similar manner to the icon faces 721 for representing people in the social networking system. Again, the depicted places (e.g., Golden Gate Bridge, Sydney Opera House, Himeji Castle and others) can be sorted in a number of ways, such as alphabetically, by popularity, or by the length of time since that place was geo-recognized by the landmark registration engine 325. When the user selects a particular place from the map navigation pane 711, the map 503 can zoom in to the corresponding region, or indicates the location of the place on the map 503 by placing an indicator such as an arrow or tack at the location. In some embodiments, when the user selects a particular place, e.g., Niagara Falls, from a list of places on the map navigation pane 711, a list of the user's connections who have visited that location can be displayed to the user. This list can serve as a set of experts who might have good advice when the user is planning to visit the selected place, because they have been to Niagara Falls in the past.

When the user controls 715 are used to select the "me" mode, a summary of the user's own travel can be displayed in the map navigation pane, including the user travel score 347 for the user and a list of places that the user has traveled to, and a map including thumbtacks or thumbnail images corresponding to places that she had traveled.

Rating Individual Images

In some embodiments, the auto-mapper server 319 can access the image scorer 343 for providing scores related to priority, quality, iconicness, or popularity, for individual images. In some situations, a given region of the map can have many geo-registered images from the user's connections within the social networking system. Instead of rendering all of these images on the map, where some would be overlapped by others, in some embodiments a subset of the images can be selected, such as the best images, most preferred images, and/or highest rated images. The map renderer 321 can use the scores from the image scorer 343 when producing the auto-map rendering 323 by placing images on a map, to ensure that images with high scores have a better chance of appearing on the auto-map rendering. The image scorer 343 can consider the image capture time (recent images have higher score), and image popularity (images with more expressions of approval, judged by number comments, "likes" upvotes,, "+1" s, and so on, have higher score). Further, images from other users of the social networking system with whom the user has a stronger relationship, for example, the user's mother or daughter, can be assigned a higher score. Also, the image scorer 343 can consider image quality, using methods for computing image quality such as described in "The Design of High-Level Features for Photo Quality Assessment," Yan Ke, Xiaoou Tang, Feng Jing, in IEEE CVPR 2006, incorporated herein by reference in its entirety. Further, it can be determined whether a given image is an iconic or canonical view of the depicted landmark with methods that quantify how often the interest points in the query image match those from training images from which the 3D model of the landmark is produced. Methods for computing this type of score is described by Ian Simon, Noah Snavely, and Steven M. Seitz. Scene Summarization for Online Image Collections, in ICCV, 2007, incorporated herein in its entirety.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure.

CALL OUT NUMBERS IN FIGURES 50 social networking system
99 user access device
101 image capture unit
105 digital processor
107 microphone
109 speaker
111 accelerometer
113 GPS sensor
115 gyroscope
117 other sensors
119 memory
121 color display
123 input device
133 Internet
135 server
137 mobile phone network
141 user database
143 image collection databases
201 user
203 social connection
319 auto-mapper server
321 map renderer
323 auto-map rendering
325 landmark registration engine
327 database
329 geo-registration
331 auxiliary geo-information
333 image
335 metadata
341 travel scorer
343 image scorer
345 travel destination lists
347 user travel score
401 feature detector
403 image features
405 feature matcher
407 camera pose estimator
411 3D model database
413 auxiliary database
415 geo-registration database
425 sensor info
429 logo
431 geo-registered points
435 circled region
437 3D points
439 point annotator
445 3D point annotator
451 logo image
471 reference image
475 reference annotation
481 rendered annotation
501 thumbnail image
503 map
505 interface controls
601 inset map
603 geo-coordinates
605 auxiliary display
607 thumbnail images
609 action suggestion
701 travel news pane
703 thumbnail image
705 headline
711 map navigation pane
713 user controls
715 user controls
721 icon faces
723 user name

The invention claimed is:

1. A method for identifying visited travel destinations from a set of digital images associated with users of a social networking system, the method comprising:
providing, by one or more computing devices, access to an individual user's account, including the individual user and other users affiliated with the individual user via the social networking system;
receiving, by the one or more computing devices, one or more digital images from a computing device associated with the individual user and from one or more second computing devices associated with the other users of the social networking system;
determining, by the one or more computing devices, from each digital image, a geo-location for each digital image;
computing a user travel score for a user of the social networking system who is either the individual user or affiliated with the individual user from the geo-located images from the user of the social networking system, wherein the user travel score is computed by:
determining the number of unique landmarks from among the user's geo-located images, and
computing the user travel score for the user based on the determined number of unique landmarks; and
displaying, by the one or more computing devices, each geo-located image on a map at a position corresponding to the determined geo-location for the geo-located image and the user travel score.

2. The method of claim 1, wherein each digital image comprises pixel values and determining the geo-location for each digital image includes extracting one or more features from the pixel values of a particular digital image, and using the one or more features to determine a geo-location for the particular digital image.

3. The method of claim 2, wherein the features extracted from the pixel values of the particular digital image include a set of interest feature points, and using the one or more features to determine a geo-location for the particular digital image includes using the interest feature points to determine the geo-location for the particular digital image.

4. The method of claim 3, wherein using the one or more features to determine a geo-location for the particular digital image includes finding matches between the set of interest feature points for the particular digital image and points associated with a 3D model representing a location or landmark.

5. The method of claim 1, wherein displaying each geo-located image includes displaying an indication of the owner of the digital image.

6. The method of claim 1, wherein displaying each geo-located image comprises displaying one or more hyperlinks associated with the determined geo-location.

7. The method of claim 1, wherein computing the user travel score is further based on whether the user is the most recent visitor to a location among the individual user and other users affiliated with the individual user.

8. The method of claim 1, wherein computing the user travel score is further based on whether a geo-location for an given digital image provided by the user corresponds to a geo-location for the user when given image was provided by the user.

9. A method for identifying visited travel destinations from a set of digital images associated with users of a social networking system, the method comprising:
providing, by one or more computing devices, access to an individual user's account, including the individual user and other users affiliated with the individual user via the social networking system;
receiving, by one or more computing devices, one or more digital images from a computing device associated with the individual user and from one or more second computing devices associated with the other users of the social networking system;
determining, by one or more computing devices, from each digital image, a geo-location for each digital image;
selecting, by one or more computing devices, an action suggestion for the individual user based on the determined geo-location for a digital image;
computing a user travel score for a user of the social networking system who is either the individual user or affiliated with the individual user from the geo-located images from the user of the social networking system, wherein the user travel score is computed by:
determining the number of unique landmarks from among the user's geo-located images, and
computing the user travel score for the user based on the determined number of unique landmarks; and
displaying, by one or more computing devices, the action suggestion and the user travel score to the user.

10. The method of claim 9, wherein the action suggestion is selected based on the determined geo-location for a digital image belonging to another user of the social networking system.

11. The method of claim 9, wherein each digital image includes pixel values, and determining the geo-location for each digital image includes extracting one or more features from the pixel values of a particular digital image, and using the one or more features to determine a geo-location for the particular digital image.

12. The method of claim 11, wherein the features extracted from the pixel values of the particular digital image include a set of interest feature points, and using the one or more features to determine a geo-location for the particular digital image includes using the interest feature points to determine the geo-location for the particular digital image.

13. The method claimed in claim 12, wherein using the one or more features to determine a geo-location for the particular digital image includes finding matches between the set of interest feature points for the particular digital image and points associated with a 3D model representing a location or landmark.

14. The method of claim 9, wherein computing the user travel score is further based on whether the user is the most recent visitor to a location among the individual user and other users affiliated with the individual user.

15. The method of claim 9, wherein computing the user travel score is further based on whether a geo-location for an given digital image provided by the user corresponds to a geo-location for the user when given image was provided by the user.

16. A method for identifying visited travel destinations from a set of digital images associated with users of a social networking system, the method comprising:
providing access to an individual user's account, including the individual user and other users affiliated with the individual user via the social networking system;
receiving one or more digital images from a computing device associated with the individual user and from one or more second computing devices associated with the other users of the social networking system;
determining, from each digital image, a geo-location for each digital image;
generating a status message based on the determined geo-location for a digital image; and
making the generated status message available to users of the social networking system;
computing a user travel score for a user of the social networking system who is either the individual user or affiliated with the individual user from the geo-located images from the user of the social networking system, wherein the user travel score is computed by:
determining the number of unique landmarks from among the user's geo-located images, and
computing the user travel score for the user based on the determined number of unique landmarks; and
displaying the user travel score.

17. The method of claim 12, further comprising using the user travel score to organize the individual user's connections from the social networking system.

18. The method of claim 16, wherein each digital image includes pixel values and determining the geo-location for each digital image includes extracting one or more features from the pixel values of a particular digital image, and using the one or more features to determine a geo-location for the particular digital image.

19. The method of claim 18, wherein the features extracted from the pixel values of each digital image include a set of interest feature points, and using the one or more features to determine a geo-location for the particular digital image includes using these interest feature points.

20. The method of claim 16, wherein computing the user travel score is further based on whether the user is the most recent visitor to a location among the individual user and other users affiliated with the individual user.

* * * * *